G. L. GRIFFITH.
AUTOMOBILE WHEEL.
APPLICATION FILED MAR. 12, 1912.
1,056,664.
Patented Mar. 18, 1913.
2 SHEETS—SHEET 2.
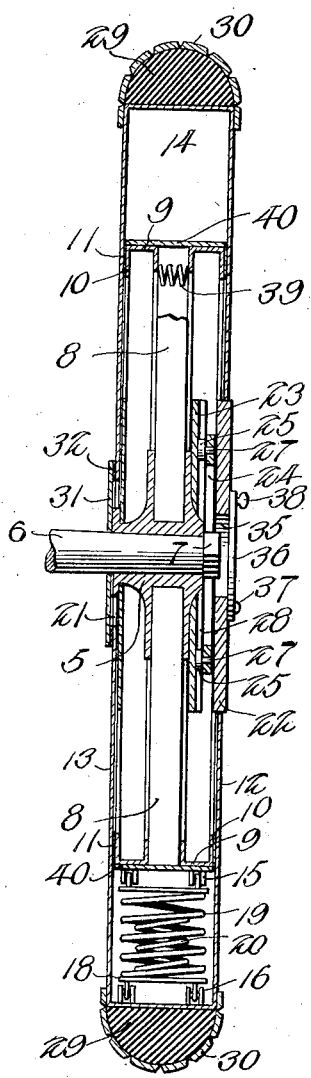
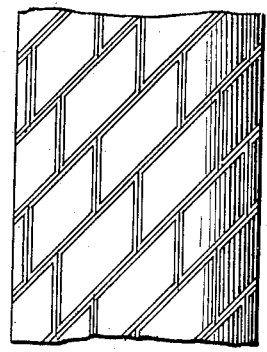
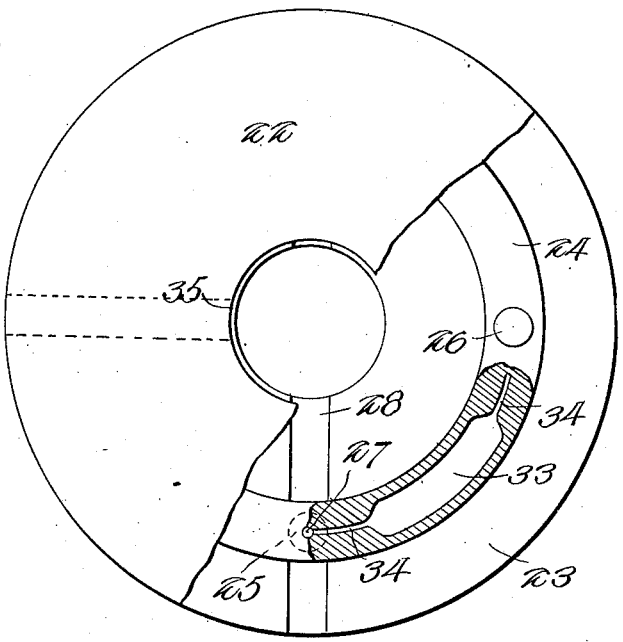
Witnesses
Hugh Ott.
Inventor
Glade L. Griffith
By Victor J. Evans
Attorney

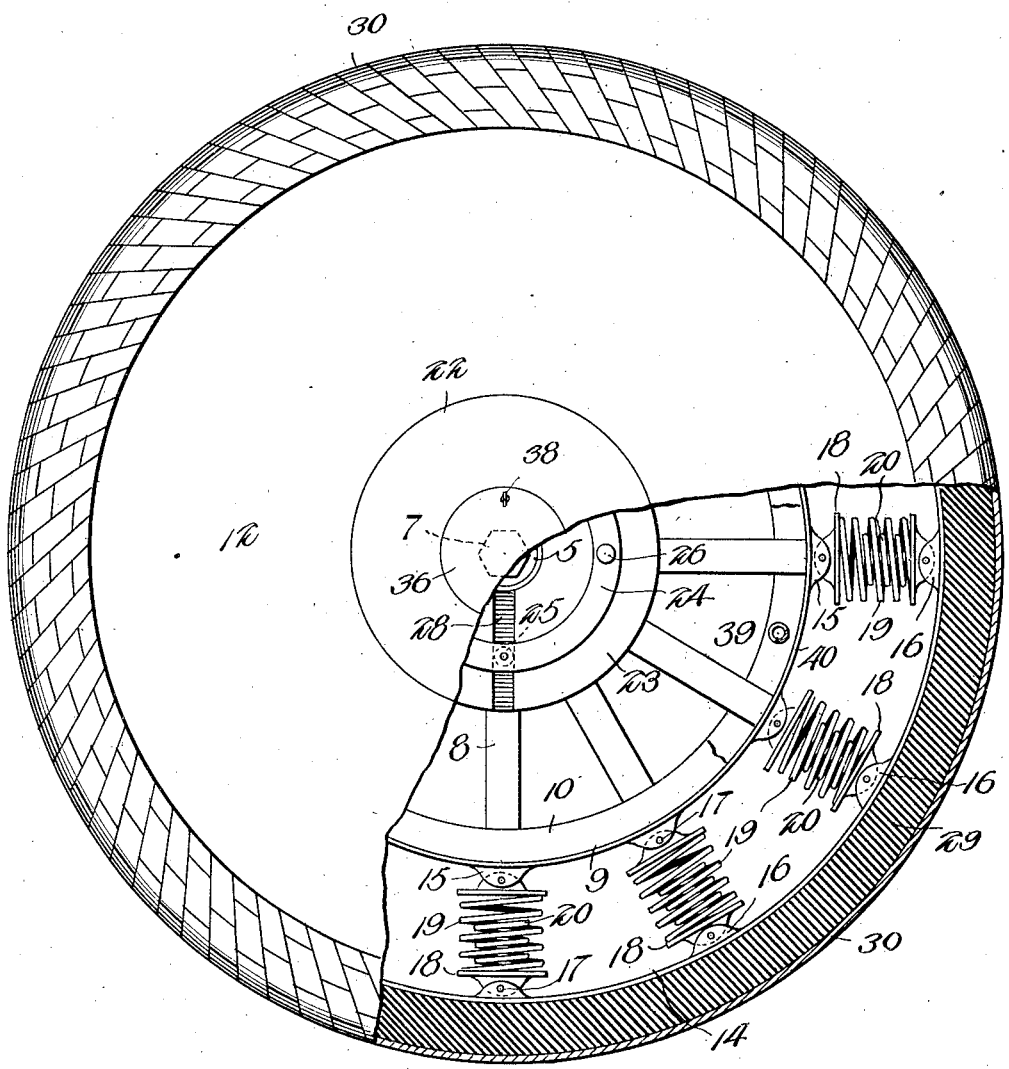

UNITED STATES PATENT OFFICE.

GLADE L. GRIFFITH, OF BLOCKTON, IOWA.

AUTOMOBILE-WHEEL.

1,056,664.  Specification of Letters Patent.  Patented Mar. 18, 1913.

Application filed March 12, 1912.  Serial No. 683,202.

*To all whom it may concern:*

Be it known that I, GLADE L. GRIFFITH, a citizen of the United States, residing at Blockton, in the county of Taylor and State of Iowa, have invented new and useful Improvements in Automobile-Wheels, of which the following is a specification.

The invention relates to vehicle wheels and more particularly to the class of spring wheels.

The primary object of the invention is the provision of a wheel of this character in which a number of springs are arranged therein so as to absorb shocks incident to the travel of the wheel thereby assuring maximum life to the same and obviating the possibility of the breaking down of the wheel during hard usage.

Another object of the invention is the provision of a wheel of the spring type which possesses maximum resiliency without the use of an ordinary pneumatic tire, thereby permitting the wheel to freely roll over a ground surface and to absorb all shocks incident to its travel.

A further object of the invention is the provision of a spring wheel the casing of which is made so as to possess the requisite strength and lightness thereby minimizing the cost of manufacture of the wheel, and also render it dust and dirt proof.

A still further object of the invention is the provision of a wheel of this character in which the springs are so arranged that when the casing of the wheel receives a shock the springs will be brought into action except the two on a horizontal plane thereby absorbing the shock so as to relieve undue strain upon the wheel.

A still further object of the invention is the provision of a spring wheel which is simple in construction, reliable and efficient in operation and inexpensive in manufacture.

With these and other objects in view, the invention consists in the construction, combination and arrangement of parts as will be hereinafter more fully described, illustrated in the accompanying drawings and pointed out in the claim hereunto appended.

In the drawings:—Figure 1 is a side elevation of a spring wheel constructed in accordance with the invention, the same being shown partly in vertical section. Fig. 2 is a vertical, transverse, sectional view through the wheel. Fig. 3 is a fragmentary plan view of the tread of the wheel. Fig. 4 is a plan view of the universal connection between the hub and the casing of the wheel, the parts thereof being partly broken away.

Similar reference characters indicate corresponding parts throughout the several views in the drawings.

Referring to the drawings by numerals the spring wheel comprises a center hub 5 provided with an outwardly tapering bore adapted to receive a tapered axle spindle 6 carrying the usual nut 7 threaded on its outer end for retaining the hub on the spindle. Fixed in the hub in the ordinary well-known manner are radially arranged spokes 8 on opposite sides of which and at their outer ends are disposed rings 9 the same being formed with inturned flanges 10 at their outer edges and provided with a fabric covering 11 on their outer faces to frictionally contact with the inner and outer side plates 13 and 12 respectively of a casing 14 which is preferably constructed from metal, although the same may be made from other material should it be desired.

Arranged concentrically with respect to the rings 9 and fixed to the outer ends of the spokes 8, is an annulus 40, the rings 9 being designed to frictionally engage said annulus. This annulus 40 has formed integrally therewith at intervals throughout the circumference of the same alining ears 15, and likewise fixed to or integral with the inner face of the periphery of the casing 14 are similar ears 16. Connected with the ears 15 and 16 by means of pivots 17 are the end plates or disks 18 of coiled compression springs 19 which for the sake of clearness will be hereinafter termed "primary springs."

Arranged within the primary springs 19 are coiled auxiliary compression springs 20 the outer ends of which are stationarily mounted upon the outermost end disks or plates 18, the said auxiliary springs being of less length than the primary springs and only coöperate therewith when undue shocks or jars are transmitted to the wheel when traveling upon the ground surface or other foundation. The pivots 17 connecting the end plates or disks 18 to the ears 15 and 16 permit the rocking of the springs 19 on opposite sides of the two springs disposed perpendicular when the wheel is traveling thereby enabling all of the springs to absorb any shocks or jars incident to the wheel when active.

The plates 12 and 13 of the casing 14 are formed with center openings 21 and the opening in the plate 12 receives the outermost disk of a pair of disks 22 and 23 respectively connected by means of a universal joint presently described, the disk 22 being fixed in any suitable manner to the plate 12 of the casing while the disk 23 is fixed to the outer side of the hub 5 and arranged between the same is the universal joint comprising a ring 24 supporting at opposite sides thereof pairs of opposite friction rollers 25 and 26 respectively, the same being rotatably mounted upon stud spindles 27 projecting outwardly from the ring member 24 at opposite sides thereof. Formed in adjacent faces of the disks 22 and 23 are centrally disposed guide slots 28 the same being arranged at right angles to each other and in which engage the friction rollers 25 and 26, the same being adapted to travel in the said slots on the displacement of the casing 14 with respect to the hub 5 and in this manner the said hub will be prevented from turning independently of the casing during the travel of the wheel.

Mounted upon the periphery of the casing 14 are a plurality of annular resilient bands 29 over which lies a tread covering comprising a series of link connected tread plates 30 the same being arranged diagonally across the tread of the wheel. The tread covering is fixed to the casing in any suitable manner.

Fixed to the hub 5 at the inner end thereof is a closure disk 31 the same being designed to close the opening 21 in the plate 13 of the casing, and has on one face thereof a fiber covering 32 which frictionally engages the adjacent surfaces of the plate 13 of the casing, thus rendering a dirt and dust proof closure. At the outer end of the hub formed in the ring 24 at intervals thereof are oil pockets or reservoirs 33 from which lead oil delivery ducts or vents 34 to the spindles 27 for lubricating the rollers 25 and 26 journaled thereon.

The disk 22 is formed with a central opening 35 which permits access to be had to the nut 7 of the spindle 6 and also to the interior of the casing and this opening is closed by means of a cap 36 pivoted at 37 to the disk, the cap being locked in closed position by means of the screw 38.

Interposed between the rings 9 are coiled expansion springs 39 the same being fixed at their ends to the said rings and are designed to exert outward pressure upon the rings to sustain the flanges 10 in closed contact with the inner surfaces of the said plates 12 and 13 of the casing as will be apparent, the rings 9 being detached from the spokes 8 which as heretofore stated are secured at their outer ends in the annulus 40 on which are slidably supported the said rings so that the same may be moved laterally thereon as will be clearly apparent.

From the foregoing description, taken in connection with the accompanying drawings, it is thought that the construction and operation of the invention will be clear.

What is claimed is:—

A spring wheel comprising a hub, spokes extending radially from the hub, an annulus concentrically disposed about the hub and fixed to the spokes, a casing concentric to and inclosing said annulus and having a resilient outer tread, resilient means interposed at intervals between the annulus and the casing, ring members arranged at opposite sides of the spokes and working against the inner periphery of the annulus and against the inner faces of the sides of the casing, and extension means interposed between the rings to force the same laterally in opposite directions against the sides of the casing, so as to form tight joints therebetween.

In testimony whereof I affix my signature in presence of two witnesses.

GLADE L. GRIFFITH.

Witnesses:
 H. LUPTON,
 ELLIS NULPH.

---

Copies of this patent may be obtained for five cents each, by addressing the "Commissioner of Patents, Washington, D. C."